United States Patent [19]

Broutman

[11] 4,267,285
[45] May 12, 1981

[54] COMPOSITES OF POLYMERIC MATERIAL AND THERMOSETTING RESINOUS FIBERS AND PARTICLES AND METHOD

[76] Inventor: Lawrence J. Broutman, 1037 Edgebrook La., Glencoe, Ill. 60022

[21] Appl. No.: 67,901

[22] Filed: Aug. 20, 1979

[51] Int. Cl.³ .............................................. C08L 23/12
[52] U.S. Cl. .................................... 525/145; 264/349; 428/297; 428/323; 428/327; 428/375; 428/391; 428/392; 428/394; 428/397; 428/401; 525/133; 525/134; 525/164
[58] Field of Search ................ 264/349, 171; 428/297, 428/323, 327, 372, 373, 374, 391, 392, 394, 397, 401, 364, 229, 224, 375; 525/133, 134, 145, 164

[56] References Cited

U.S. PATENT DOCUMENTS

| | | | |
|---|---|---|---|
| 3,650,102 | 3/1972 | Economy et al. | 428/229 |
| 3,714,111 | 1/1973 | Economy et al. | 260/38 |
| 3,961,123 | 6/1976 | Ohtomo | 428/224 |
| 4,110,277 | 8/1978 | Economy et al. | 428/364 |

Primary Examiner—James J. Bell
Attorney, Agent, or Firm—McDougall, Hersh & Scott

[57] ABSTRACT

Composites formed of an organic polymeric matrix and cured thermosetting resinous fibers and/or particles dispersed therein and a method for preparing the same.

22 Claims, No Drawings

COMPOSITES OF POLYMERIC MATERIAL AND THERMOSETTING RESINOUS FIBERS AND PARTICLES AND METHOD

This invention relates to new and novel compositions fabricated of cured thermosetting resinous fibers and organic polymeric material and it relates more particularly to polymeric compositions containing cured phenolic resinous fibers for improving the physical, chemical, and electrical characteristics of the polymeric composition and plastic products formed thereof.

As used herein, the term "cured thermosetting resinous fibers" is meant to include fibers formed of such thermosetting resinous or polymeric materials as represented by phenol formaldehyde and other phenol-aldehyde resins, melamine formaldehyde resins, epoxy resins and the like. However, the invention will hereinafter be described with reference to phenolic resinous polymers as representative of the preferred thermosetting resinous fiber forming material. As used herein, the term "phenolic" refers to the class of resinous materials described in U.S. Pat. No. 3,650,102 and which can be made available in the form of a novolac for fiber formation and subsequent curing by polymerization and cross linking to form the infusible, insoluble, cured fiber.

Procedures for conversion of phenolic novolac resins into cured fibers are well known. U.S. Pat. No. 3,650,102 describes such fiber forming process wherein a phenolic novolac resin in an A or B stage is reduced to a molten or plastic stage and formed into fibers by conventional fiberizing technique, as in the glass fiber industry, to produce thermoplastic, uncured novolac fibers. The novolac fibers are then converted to the cured, infusible, C stage by heating the fibers, preferably in the presence of formaldehyde and an acid catalyst, at a temperature and for a time sufficient to advance the molecular weight of the novolac and cross link the molecules to obtain infusible, cured phenolic fibers.

Fibers of phenolic, epoxy, and other thermosetting resins are characterized by a number of properties incapable of being achieved with corresponding bulk resins. The tensile strength can be markedly increased to possibly as much as 100,000 psi compared to tensile strength in the vicinity of 6,000 for the bulk phenolic resins. The stiffness of such thermosetting fibers is also increased by comparison with fibers formed of other thermoplastic resins and the chemical inertness is far superior by reason of the insolubility and infusibility of the fibers formed of such thermosetting phenolic or other thermosetting resinous materials. Strength retention of phenolic fibers at elevated temperature is far superior to that of other common organic fibers.

Such cured thermosetting fibers, such as formed of phenolic resins, are normally produced in diameters within the range of 9 to 25 microns. Phenolic fibers have been observed having 60,000 psi tensile strength and $1.5 \times 10^6$ psi elastic modulus and breaking elongation of 44%.

The inherent color of phenolic fibers is gold and the fibers tend to darken when subjected to elevated temperature in air or upon aging in light. As described in U.S. Pat. No. 3,716,521, by blocking the phenolic hydroxyl groups with an appropriate ester or ether, or by simply acetylating the hydroxyl groups, it becomes possible to obtain a white colorfast fiber. The acetylated fibers have a significantly improved thermo-oxidative stability over the unacetylated fibers. This suggests a potential use in applications where the fibers would be exposed to elevated temperature between 150° C. and 200° C. for extended periods of time.

Additional characteristics of phenolic fibers which are of interest with respect to their use in combinations with organic polymers include their dielectric loss factor, corrosion resistance and inflammability. The dielectric loss is large enough to enable the fibers to be heated by dielectric or R-F heating methods. With respect to corrosion resistance, the fibers have excellent resistance to organic solvents and non-oxidizing acids. With respect to flammability, the fibers are non-burning and infusible. When exposed to a flame, the fibers convert to carbon fiber with evolution of carbon dioxide and water with only traces of combustible gases being formed.

It is an object of this invention to provide a method for combining phenolic and other thermosetting fibers with various polymeric matrices including thermoplastic, thermosetting plastics, elastomers, adhesives, and foams, thus producing various phenolic fiber or other thermosetting fiber filled polymeric materials.

In the case of phenolic fiber filled thermoplastics, the fibers can be incorporated into the thermoplastic resinous matrix in a batch process, such as by the use of a Banbury type mixer, or in a continuous process, such as by the use of a single or twin screw extruder or other continuous mixing device such as a roller mill. The fibers may be added as chopped fibers or as short length fibers, typically less than 1 inch, or the phenolic fibers may be introduced, as to an extruder or roller mill, as continuous rovings or strands. Continuous fibers or rovings may also be coated with a molten matrix resin, as through a wire or cable coating die, thus minimizing the effect from exposure to the action of the extruder screw. Another method of incorporation into thermoplastic resinous materials involves first forming the phenolic fibers into a fiber mat or fabric and then calendering a molten thermoplastic matrix material with the mat or fabric to form a continuous sheet product.

In accordance with the practice of this invention, the weight fraction of phenolic or other thermosetting resinous fiber in the organic polymeric matrix may range from a few weight percent to approximately 80% by weight of the composite fiber, depending somewhat on the materials and the processing parameters.

The contribution of the phenolic fiber component to the physical properties of the polymer product can be greatly enhanced by increase in the bonded relation between the surfaces of the phenolic fibers and the matrix material. Modification of the phenolic fiber surfaces can be accomplished by adding a surface treatment or coating to the fiber surfaces at any time between the fiber production and its incorporation into the polymer. In the alternative, such treatment can be effected by addition of treating material directly to the polymer with a view towards its migration to the surfaces of the fiber during incorporation of the fiber into the polymer matrix. Such surface treatment serves as a bridge between the fiber and the polymer, improving the interfacial strength and wettability of the fiber. For example, in the case of phenolic fiber reinforced polypropylene, phenolic hydroxyl groups and other oxides which may be formed during aging of the fiber are not compatible with the relatively nonpolar polypropylene. Suitable treatment of the surface can be effected by coating the fibers with a carboxylated propylene such as a copolymer of maleic anhydride and propylene. Bonding to the phenolic fiber surface occurs through the more polar carboxyl groups while compatibility can still be achieved with the polypropylene. Other treatments provide a similar effect, including treatment with a chlorinated polyolefin, titanate coupling agent, or organo silane coupling agent in which the silane has hydroxyl or other functional groups attached to the silicon atom. For other polymers, such as polyethylene, polystyrene and its copolymers, polyesters, polyphenyleneoxide, nylon, etc., similar surface treatment can be utilized. In the case of polyethylene, preferred use is made of a carboxylated polyethylene, chlorinated polyethylene, a carboxylated atactic polypropylene and titanate or a silane coupling agent of the type described as the surface treating agent.

In addition to the application of a surface treatment or in substitution therefor, the molecular structure of the fiber at the surface can be chemically altered to improve wettability and bonding with the surrounding matrix polymer. Any of an extremely wide variety of esterification or etherification reagents may be employed to effect blocking of the phenolic hydroxyl group. For example, such blocking of the phenolic hydroxyl group can be accomplished by replacement of the hydrogen atom with blocking groups which are monovalent radicals having the formula R— or

in which R is preferably selected from the group consisting of lower alkyl; lower alkyl having one or more hydrogen atoms replaced by halogen, such as fluorine or chlorine; phenyl; and phenyl having one or more hydrogen atoms replaced by halogen and/or a lower alkyl. As used herein, the term "lower alkyl" is meant to include $C_1$ to $C_6$ alkyl. Particularly suitable reactants for esterification of the phenolic hydroxyl group include anhydrides of carboxylic acid, acylation with anhydrides of lower alkanoic acids being preferred, especially acetylation with acetic anhydride. Particularly suitable reactants to etherify the phenolic hydroxyl groups are diethyl sulfate and dimethyl sulfate. The selected reactant may be a liquid, a solid, a gas or vapor and the reaction conditions may be selected accordingly. Since only the surface needs modification, very short reaction times are possible, such as flash treatment.

The effect of a surface treatment on the physical properties of the composite can be demonstrated with phenolic resinous fiber reinforced polypropylene. The fibers are treated with a carboxylated polypropylene from a 5% by weight solution or dispersion in kerosene. The heat distortion temperature, breaking elongation and impact strength of the resulting composite containing 2 to 25 percent by weight treated phenolic fiber are greatly improved. The breaking elongation increases from 3 to 5 percent for untreated fiber to more than 10 percent for treated fiber composites.

In addition to the improvement in strength, toughness, modulus of elasticity, heat resistance and heat distortion temperature of polymers containing phenolic resinous fibers, the fibers provide polymers with improved resistance to flame. The fibers do not burn and do not emit toxic acids when exposed to direct flame.

Aside from their addition to their use as a reinforcement in a matrix of polymeric material the phenolic fibers contribute an important characteristic to the matrix in which the phenolic fibers are incorporated in accordance with the practice of this invention. The presence of such phenolic resinous fibers in the organic polymeric matrix allows the resulting composite to be heated by R-F, dielectric, or microwave heating. Thus the presence of phenolic resinous fiber in the polymeric matrix enables the composite to be preheated by dielectric or microwave prior to molding, extrusion, thermoforming, or solid phase forming. In addition, the composite can be dried by such electronic heating technique before processing to a desired product by any of the described forming methods. Rapid annealing of injection molded parts can be accomplished by dielectric heating when such parts are fabricated of other phenolic resinous fibers. This is particularly beneficial with parts having a thickness greater than ¼ inch. Also, selective heating for annealing and the like can be performed by shielding portions of the molded parts so that such parts will not receive the radiation, such as by shielding with aluminum foil.

Liquid polyester or epoxy resins containing such phenolic resinous fibers enables more rapid and uniform curing by dielectric heating.

The phenolic resinous fibers can be used, in accordance with the practice of this invention, in combination with other reinforcements such as glass fibers, carbon fibers and the like for purposes of allowing dielectric heating to be utilized as well as to alter the physical and mechanical properties of the resulting composite. The effect of phenolic resinous fiber on the heat rate when the composite is subjected to dielectric heating can be increased by coating the fibers with a substance having a still greater dielectric loss factor for the selected frequency of the radiation. For example, phenolic resinous fibers coated with a Neoprene rubber would provide the described benefits in most conventional dielectric heating techniques.

The properties of phenolic resinous fiber - polymer matrix composite can be further modified, in accordance with the practice of this invention, by the inclusion of powders or particulates of a phenol aldehyde resin, urea formaldehyde resin and/or melamine formaldehyde resin in combination with the phenolic resinous fibers in the polymeric matrix material. The above particulates can also be incorporated by themselves, without fiber, although the increase in properties will not be as great. The average particle size of such powder or particulate should generally be less than 0.005 inch but greater than 5 microns and, when present, can be employed in an amount up to 25 percent by weight of the composite and preferably in an amount within the range of 2 to 20 percent by weight. One of the benefits derived from the presence of such powders or particulates is to increase the heating rate of the composite when subjected to dielectric heating since such powders are selected of materials having high dielectric loss factor. In order to optimize the physical properties of the composite, the powders can be surface treated or chemically altered by the same technique described for the phenolic resinous fiber. The powders may be added to the polymeric matrix after they have been fully cured or they may be admixed with the polymer matrix before being fully cured or while still in their A or B stage for conversion to a fully cured stage with only a minor amount of particle fusion. Because of the fine size of the powder, with resulting rapid heat transfer throughout the particle mass, total curing time will be short, generally less than the required mixing time, such as less than 3 minutes.

In addition to the use of the phenolic resinous fibers and the described powders to reinforce solid polymers, they can also be used to reinforce polymer foam, such as of polyurethane. Inclusion of such fibers, phenolic fibers and/or plus powder decreases the amount of smoke production and toxic gases released during burning as well as reducing the flammability of the composite. The fibers also improve mechanical properties of the foam such as strength, stiffness and temperature resistance. In order to optimize physical properties, the phenolic resinous fibers should be surface treated or chemically altered as heretofore described.

The invention will now be illustrated by way of the following examples in which Example 1 is addressed to the combination of polypropylene with continuous phenolic resinous fibers while Example 2 is an example of a composite formed of a polypropylene matrix in which phenolic resinous fibers and phenol formaldehyde powder is incorporated.

EXAMPLE 1

Continuous phenolic fiber roving (3720 denier/bundle) is combined with a stabilized polypropylene resin (e.g. Hercules 6523) utilizing a vented twin screw extruder to achieve a fiber percent by weight of 28 percent. The roving is first surface treated with a carboxylated polypropylene by passing the roving through a dispersion in kerosene at 75° F. followed by drying at 350° F. The treated rovings are fed into the extruder at the feed section along with the polypropylene resin. The extruder barrel temperatures are set at 400° F. with the die temperature set at 450° F. and a 5 strand die is used. The extruded strands are cooled in a water bath, air dried, and fed into a pelletizer where they are cut to ⅛ inch lengths. Injection molded plaques are prepared from the pellets in order to determine physical properties. Heat distortion temperatures (66 psi) were greater than 140° C., tensile yield strength was measured to be 6,000 psi, tensile modulus of elasticity was 300,000 psi, and tensile elongation to failure was 20 percent. A plate of ⅛ inch thickness was placed in a 500 watt electronic heater, generating radio frequency energy at 70–80 megahertz. For a 60 second heating time, the plate temperature was approximately 175° F.

EXAMPLE 2

Continuous phenolic resinous fiber roving (3720 denier/bundle) is combined with a stabilized polypropylene resin powder into which has been blended a phenol formaldehyde powder in a partially cured B stage. The weight fraction of phenol formaldehyde powder in the propylene - phenol formaldehyde powder blend is 20 percent. The fiber roving is first treated with carboxylated propylene by passing the roving through a 5 percent dispersion in kerosene at 75° F. followed by drying at 350° F. The treated roving is then fed into the extruder through the feed section along with the premixed polymer powder. A weight fraction of fiber of 28 percent is established by feeding multiple rovings into the extruder.

The extruder barrel temperature is set at 400° F. with the die temperature at 450° F., using a 5 strand die. The strands extruded from the die are cooled in a water bath, air dried, and fed into a pelletizer where they are cut to ⅛ inch lengths.

Injection molded plaques were prepared from the pellets for use in determining physical properties. The heat distortion compared at 66 psi was greater than 145° C., tensile strength was measured at 6000 psi, tensile modulus of elasticity was 300,000 psi, and tensile elongation to failure was 20 percent. For illustration of the dielectric heating characteristics, a plate of ⅛ inch thickness was placed in a 500 watt electronic heater, generating radio frequency energy at 70–80 megahertz. Over a 60 second heating period, the plate temperature was raised to approximately 200° F.

It will be apparent from the foregoing that there is provided a new and improved utilization of fibers formed of thermosetting resinous materials for the improvement of physical and mechanical properties of organic resinous components.

It will be understood that changes may be made in the details of materials, formulation and operation without departing from the spirit of the invention, especially as defined in the following claims.

I claim:

1. A composite formed of a matrix of organic polymeric material and fibers of a cured thermosetting resinous material in an infusible insoluble stage dispersed within the matrix of organic polymeric material in which the fibers are surface treated to enhance the interbonding relationship with the polymeric material of the matrix.

2. A composite as claimed in claim 1 in which the cured thermosetting resinous material comprises a "C" stage phenolic resin.

3. A composite as claimed in claim 1 in which the fibers have a cross section within the range of 9–25μ.

4. A composite as claimed in claim 1 in which the thermosetting resinous fibers are present in an amount within the range of 2–80% by weight of the composite.

5. A composite as claimed in claim 1 in which the surface treatment of the fibers comprises a surface reaction with a carboxylated propylene, chlorinated polyolefin, titanate coupling agent or an organo silane containing functional groups.

6. A composite formed of a matrix of organic polymeric material and fibers of a cured thermosetting resinous material in an infusible insoluble stage dispersed within the matrix of organic polymeric material and in which the cured thermosetting resinous material comprises a "C" stage phenolic resin in which the phenolic hydroxyl groups are blocked to enhance the bonding relationship between the fibers and the polymeric matrix.

7. A composite as claimed in claim 6 in which the phenolic hydroxyl groups are blocked by replacement of the hydrogen atom with a R— or

group in which R is a lower alkyl, a halogenated lower alkyl, phenyl or a halogenated phenyl.

8. A composite formed of a matrix of organic polymeric material and fibers of a cured thermosetting resinous material in an infusible insoluble stage dispersed within the matrix of organic polymeric material which includes an organic resinous powder admixed with the fibers in the organic polymeric matrix.

9. A composite as claimed in claim 8 in which the powder is selected from the group consisting of phenol formaldehyde resin, a urea formaldehyde resin, and a melamine formaldehyde resin in the cured stage.

10. A composite as claimed in claim 9 in which the powder is of a particle size within the range of 5μ to 0.005 inches.

11. A composite as claimed in claim 9 in which the powder is present in an amount up to 25% by weight.

12. A composite as claimed in claim 9 in which the powder is present in an amount up to 2-20% by weight.

13. The method of producing a composite claimed in claim 1 in which the thermosetting resinous fibers are admixed with the polymeric matrix material while the latter is in a plastic stage at elevated temperature.

14. The method as claimed in claim 13 in which the fibers are admixed with the matrix material in a Banbury.

15. The method as claimed in claim 13 in which the fibers are admixed with the matrix material by introducing the fibers with the matrix material for extrusion.

16. The method as claimed in claim 13 in which the fibers are admixed with the matrix material by introducing the fibers with the polymeric matrix material between the rollers of a rolling mill.

17. The method as claimed in claim 13 which includes the step of treating the fibers for modification of their surface to enhance the bonding relationship with the polymeric matrix material.

18. The method as claimed in claim 17 in which the fibers are treated prior to their admixture with the matrix material by reaction in a solution of a compound selected from the group consisting of a carboxylated propylene, chlorinated polyolefin, titanate coupling agent and an organo silane compound containing functional groups.

19. The method as claimed in claim 17 in which the fibers are phenolic resinous fibers in which the hydroxyl groups are blocked by reaction to replace the hydrogen atom with a R— or

group in which R is a lower alkyl, a halogenated lower alkyl, phenyl or a halogenated phenyl.

20. The method as claimed in claim 13 in which the fibers are incorporated into the polymeric matrix in an amount within the range of 2-50% by weight.

21. The method as claimed in claim 20 which includes the step of adding a thermosetting resinous powder in an amount within the range of 2-20% by weight of the composite that is formed.

22. A composite formed of a matrix of an organic polymeric material and fibers of a cured thermosetting resinous material in an infusible insoluble stage dispersed within the matrix of organic polymeric material in which the thermosetting resinous fibers are admixed with the polymeric matrix material in a Banbury extruder or roller mill while the polymeric matrix material is in a plastic stage at elevated temperature.

* * * * *